(12) United States Patent
Wang

(10) Patent No.: US 10,643,559 B2
(45) Date of Patent: May 5, 2020

(54) DISPLAY PANEL DRIVING APPARATUS AND DRIVING METHOD THEREOF

(71) Applicants: HKC Corporation Limited, Shenzhen, Guangdong (CN); Chongqing HKC Optoelectronics Technology Co., Ltd., Chongqing (CN)

(72) Inventor: Mingliang Wang, Chongqing (CN)

(73) Assignees: HKC Corporation Limited, Shenzhen, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 51 days.

(21) Appl. No.: 15/580,298

(22) PCT Filed: Sep. 18, 2017

(86) PCT No.: PCT/CN2017/102012
§ 371 (c)(1),
(2) Date: Dec. 7, 2017

(87) PCT Pub. No.: WO2019/037168
PCT Pub. Date: Feb. 28, 2019

(65) Prior Publication Data
US 2019/0066612 A1 Feb. 28, 2019

(30) Foreign Application Priority Data
Aug. 23, 2017 (CN) .......................... 2017 1 0729475

(51) Int. Cl.
*G09G 3/36* (2006.01)
*G02F 1/1362* (2006.01)
*G02F 1/133* (2006.01)

(52) U.S. Cl.
CPC ....... *G09G 3/3648* (2013.01); *G02F 1/13306* (2013.01); *G02F 1/136286* (2013.01);
(Continued)

(58) Field of Classification Search
CPC .......... G02F 1/13306; G02F 1/136286; G09G 2310/0264; G09G 2310/0278; G09G 2310/08; G09G 3/3648
See application file for complete search history.

(56) References Cited

U.S. PATENT DOCUMENTS

| 2009/0109201 A1* | 4/2009 | Kim .................... G09G 3/3648 345/206 |
| 2010/0231614 A1* | 9/2010 | Vieri ................... G09G 3/3677 345/690 |

(Continued)

FOREIGN PATENT DOCUMENTS

| CN | 101000415 A | 7/2007 |
| CN | 101004902 A | 7/2007 |

(Continued)

*Primary Examiner* — Afroza Chowdhury
(74) *Attorney, Agent, or Firm* — Muncy, Geissler, Olds & Lowe, P.C.x

(57) ABSTRACT

This application provides a display panel driving apparatus includes a control unit, includes: a plurality of first drive chips, electrically connected to a display panel, and a plurality of second drive chips, electrically connected to the display panel, where the second drive chip is connected to a port; a timing controller, including a plurality of data output interfaces and a plurality of timing output interfaces, where the timing controller is separately electrically connected to the first drive chips and the second drive chips; and a circuit board, including a plurality of data input interfaces and a plurality of timing input interfaces, the plurality of data input interfaces and the plurality of timing input interfaces are electrically coupled to a source drive circuit, each data output interface is electrically coupled to the data input interfaces, and the plurality of timing input interfaces is electrically coupled to the timing output interfaces.

15 Claims, 9 Drawing Sheets

(52) U.S. Cl.
CPC .............. *G09G 2310/0264* (2013.01); *G09G 2310/0278* (2013.01); *G09G 2310/08* (2013.01)

(56) References Cited

U.S. PATENT DOCUMENTS

| | | | | |
|---|---|---|---|---|
| 2011/0164076 A1* | 7/2011 | Lee | ...................... | G09G 3/3406 |
| | | | | 345/691 |
| 2013/0229398 A1* | 9/2013 | Lee | ...................... | G09G 3/3614 |
| | | | | 345/209 |
| 2014/0091995 A1* | 4/2014 | Wang | ...................... | G09G 3/207 |
| | | | | 345/90 |
| 2016/0334657 A1* | 11/2016 | Jeon | .................. | G02F 1/133345 |

FOREIGN PATENT DOCUMENTS

| | | |
|---|---|---|
| CN | 103366666 A | 10/2013 |
| CN | 103871381 A | 6/2014 |
| CN | 204650970 U | 9/2015 |
| CN | 106531098 A | 3/2017 |
| CN | 107068097 A | 8/2017 |
| EP | 0244978 A2 | 11/1987 |

\* cited by examiner

DISPLAY PANEL DRIVING APPARATUS AND DRIVING METHOD THEREOF

BACKGROUND

Technical Field

This application relates to a chip effectiveness improvement method, and in particular, to a display panel driving apparatus and a driving method thereof.

Related Art

Recently, liquid crystal displays (LCD) have been widely used. With the improvement of driving technologies, the LCDs have such advantages as low electrical power consumption, a thin shape, a light weight, and a low drive voltage, and at present, have been widely applied to camcorders, notebook computers, desktop displays, and various projection devices.

In addition, an LCD device usually includes a gate drive circuit, a source drive circuit, and a pixel array. The pixel array has a plurality of pixel circuits. Each pixel circuit is switched on or off according to a scanning signal provided by the gate drive circuit. A data screen is displayed according to a data signal provided by the source drive circuit.

At present, for an ultra high definition (UD) assembly, design of a printed circuit board assembly (PCBA) is usually performed by using a UD timing controller (TCON), and then a UD screen is displayed. However, the UD assembly may unavoidably include some consumption testing objects needing to be lit up by using a solution having lowest costs. If an existing UD solution continues to be used, the costs may be relatively high.

SUMMARY

To resolve the foregoing technical problem, an objective of this application is to provide a display device and a chip effectiveness improvement method therefor, so as to reduce the costs of design of a drive circuit. In addition, an existing drive chip does not need to be changed, and the costs of an integrated system single chip on a client are greatly reduced. Therefore, overall product quality is improved.

The objective of this application is achieved and the technical problem of this application is resolved by using the following technical solutions. A display panel driving apparatus provided in this application includes: a control unit, where the control unit comprises: a plurality of first drive chips, electrically connected to a display panel, and a plurality of second drive chips, electrically connected to the display panel, where each of the second drive chip is connected to a port; a timing controller (TCON), comprising a plurality of data output interfaces and a plurality of timing output interfaces, where the timing controller is separately electrically connected to the first drive chips and the second drive chips and is configured to drive and transmit information transmitted by the second drive chips; and a circuit board, comprising a plurality of data input interfaces and a plurality of timing input interfaces, where the plurality of data input interfaces and the plurality of timing input interfaces are electrically coupled to a source drive circuit. The quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces.

Another objective of this application is to provide a driving method of a display panel driving apparatus comprising: arranging a plurality of second drive chips by using a control unit, where the second drive chips are connected to a port; arranging a plurality of circuit lines by using a timing controller, where the timing controller is configured to drive and transmit information transmitted by the second drive chips; and separately connecting the second drive chips to the timing controller by using the port.

The technical problem of this application may be further resolved by taking the following technical measures.

In an embodiment of this application, the quantity of the plurality of data input interfaces is n times the quantity of the plurality of data output interfaces, and each data output interface is electrically coupled to n data input interfaces, where n is a positive integer.

In an embodiment of this application, the quantity of the plurality of data output interfaces is m, and a $j^{th}$ data input interface is connected to an $i^{th}$ data output interface, where i is a remainder of diving j by m, and i, j, and m are positive integers.

In an embodiment of this application, the source drive circuit comprises a plurality of groups of source chip-on-films, and a data transmission triggering line is configured for each group; the data transmission triggering lines are electrically coupled to each other.

In an embodiment of this application, the data transmission triggering lines are electrically coupled to the timing controller; the timing controller controls connection and disconnection between the data transmission triggering lines.

In an embodiment of this application, the timing controller comprises a mode signal interface; the timing controller is electrically coupled to a gate drive circuit by using a line of the circuit board, and the timing controller outputs a mode signal by using the mode signal interface, so that the gate drive circuit is switched between a single-line scanning mode and a multi-line scanning mode; the multi-line scanning mode is a dual-line scanning mode or a three-line scanning mode; the circuit board is connected to a display substrate; the gate drive circuit runs in the multi-line scanning mode.

In an embodiment of this application, the port is configured to electrically couple to the timing controller; the port has a plurality of groups of information signals and at least one pair of frequency signals; the port comprises a plurality of adjacent circuit lines being capable of transmitting a data transmission triggering signal and at least one circuit line being capable of transmitting a gate dual-mode control signal.

In an embodiment of this application, in the driving method of a driving apparatus, the step of separately connecting the second drive chips to the timing controller by using the port comprises: interconnecting, by the timing controller by using the port, one group of a plurality of circuit lines on each of left and right sides of the timing controller and at least one frequency signal line to the second drive chips to provide the transmitted information, to perform information matching, so as to implement an information replication function.

Another objective of this application is to provide a display panel driving apparatus including: a control unit, comprises: a plurality of first drive chips, electrically connected to a display panel, and a plurality of second drive chips, electrically connected to the display panel, where each second drive chip is connected to a port; a timing controller, comprising a plurality of data output interfaces and a plurality of timing output interfaces, where the timing controller is separately electrically connected to the first drive chips and the second drive chips and is configured to drive and transmit information transmitted by the second drive chips; and a circuit board, comprising a plurality of data input interfaces and a plurality of timing input interfaces, where the plurality of data input interfaces and the plurality of timing input interfaces are electrically coupled to a source drive circuit. The quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces. The quantity of the plurality of data input interfaces is n times the quantity of the plurality of data output interfaces, and each data output interface is electrically coupled to n data input interfaces, where n is a positive integer. The quantity of the plurality of data output interfaces is m, and a $j^{th}$ data input interface is connected to an $i^{th}$ data output interface, where i is a remainder of diving j by m, and i, j, and m are positive integers. The source drive circuit comprises a plurality of groups of source chip-on-films, and a data transmission triggering line is configured for each group. The data transmission triggering lines are electrically coupled to each other; the data transmission triggering lines are electrically coupled to the timing controller. The timing controller controls connection and disconnection between the data transmission triggering lines. The timing controller comprises a mode signal interface; the timing controller is electrically coupled to a gate drive circuit by using a line of the circuit board, and the timing controller outputs a mode signal by using the mode signal interface, so that the gate drive circuit is switched between a single-line scanning mode and a multi-line scanning mode. The multi-line scanning mode is a dual-line scanning mode or a three-line scanning mode; the circuit board is connected to a display substrate; the gate drive circuit runs in the multi-line scanning mode. The plurality of second drive chips is of a symmetric design.

By means of this application, the costs of design of a drive circuit can be reduced; in addition, an existing drive chip does not need to be changed, and the costs of an integrated system single chip on a client are greatly reduced.

DETAILED DESCRIPTION

The following embodiments are described with reference to the accompanying drawings, used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and descriptions are considered to be essentially exemplary, rather than limitative. In the figures, units with similar structures are represented by the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a base is described to be "on" "another component", the component may be directly on the another component, or there may be an intermediate component.

In addition, throughout this specification, unless otherwise explicitly described to have an opposite meaning, the word "include" is understood as including the component, but not excluding any other component. In addition, throughout this specification, "on" means that one is located above or below a target component and does not necessarily mean that one is located on the top based on a gravity direction.

To further describe the technical means used in this application to achieve the application objective and effects thereof, specific implementations, structures, features, and effects of a display panel driving apparatus and a driving method thereof provided according to this application are described in detail below with reference to the drawings and preferred embodiments.

A display panel in this application may include an LCD panel. The LCD panel includes: a thin film transistor (TFT) substrate, a color filter (CF) substrate, and a liquid crystal layer formed between the two substrates. The display panel may alternatively be an organic light-emitting diode (OLED) panel or a quantum dots light-emitting diode (QLED) panel.

In an embodiment, the display panel in this application may be a curved-surface display panel.

In an embodiment, a TFT and a CF in this application may be formed on a same substrate.

Figure 1:
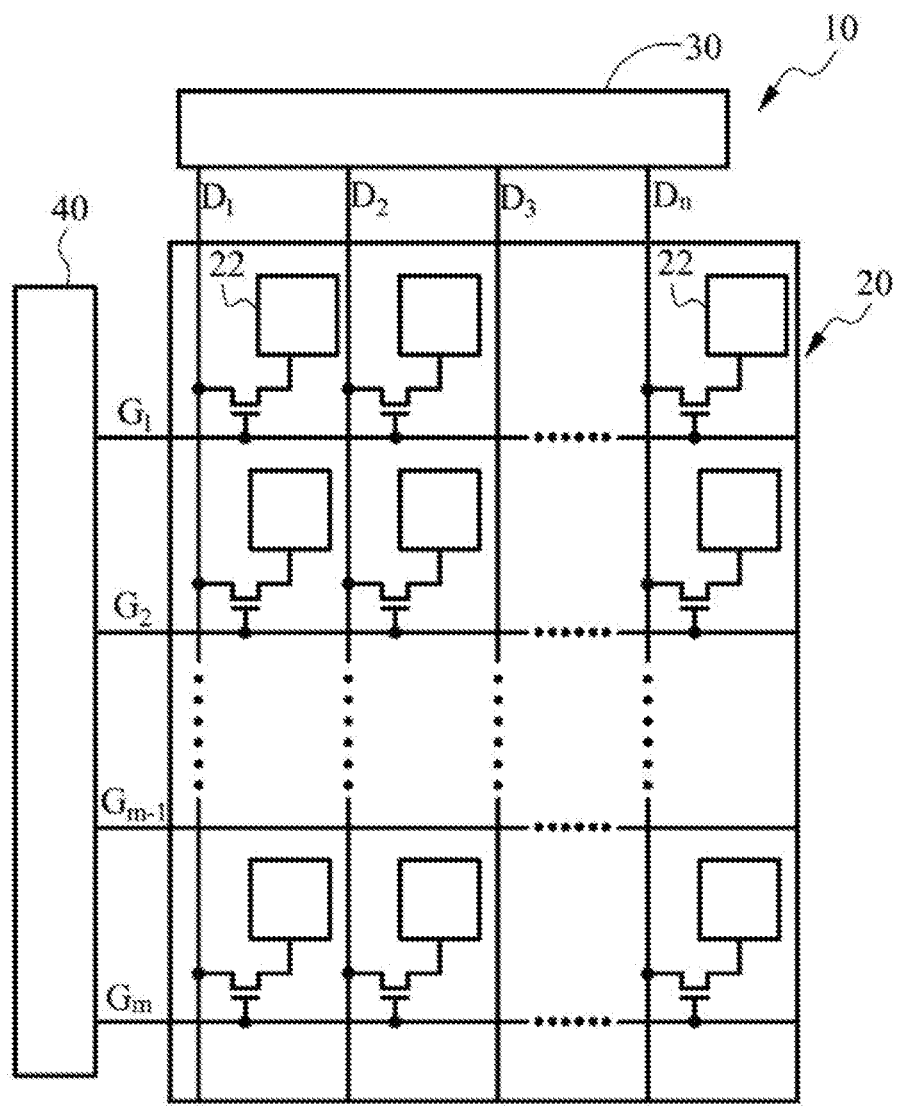
FIG. 1 is a schematic diagram of an exemplary LCD panel formed by an LCD pixel array.

FIG. 1 is a schematic diagram of an exemplary LCD panel formed by an LCD pixel array. Referring to FIG. 1, an LCD panel 10 includes a display module 20 formed by a plurality of pixels 22 arranged in a two-dimensional array. The pixels are controlled and driven by a plurality of data lines D1, D2, ..., Dn and a plurality of gate lines G1, G2, ..., Gm. A data signal of each data line is provided by a data drive chip 30, and a gate signal of each gate line is provided by a gate drive chip 40.

Figure 2A:
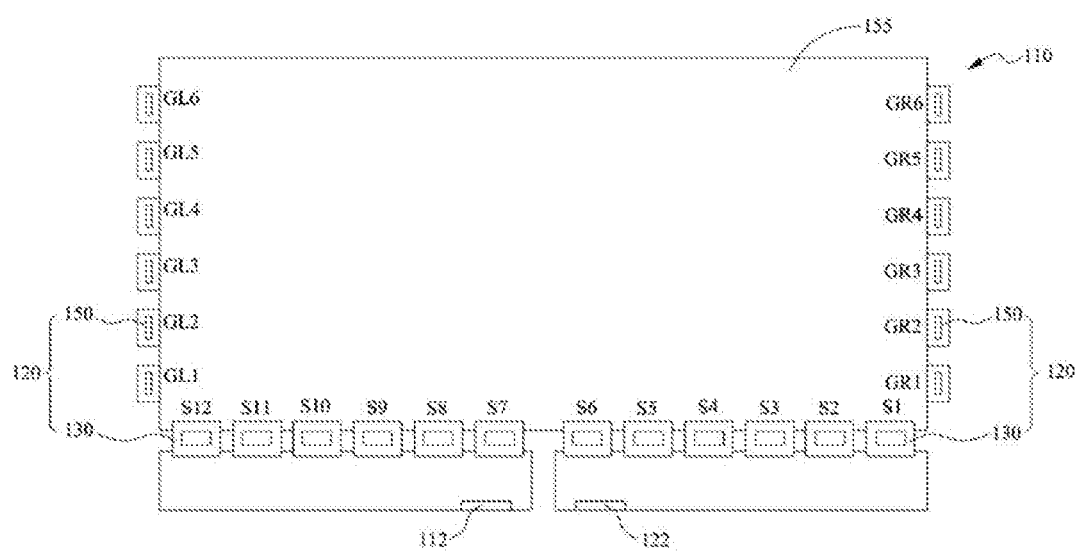
FIG. 2a is a schematic diagram of an exemplary driving apparatus.
Figure 2B:
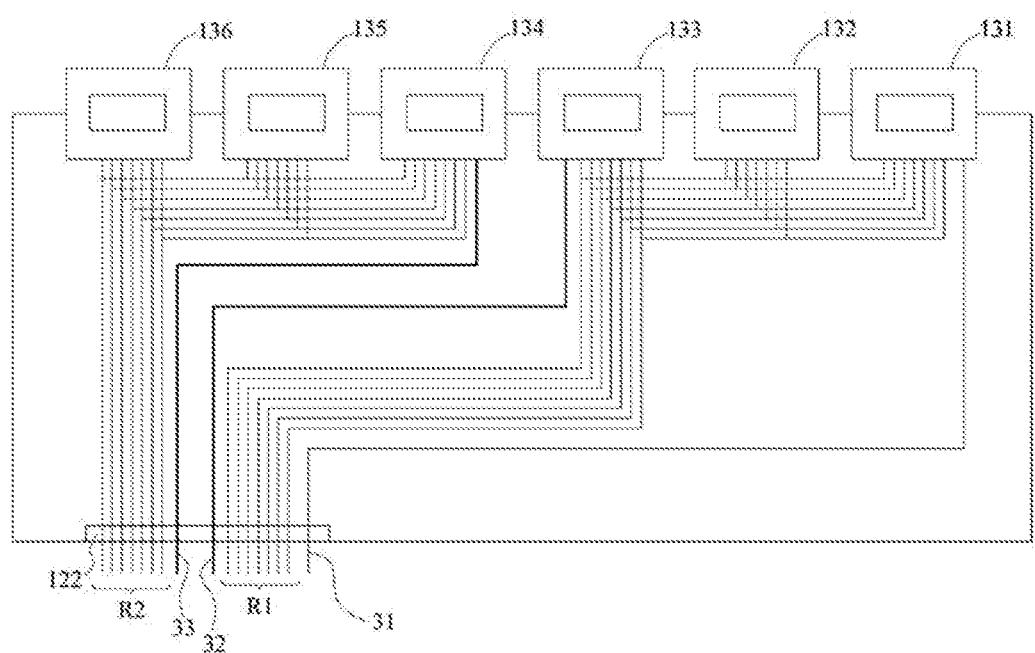
FIG. 2b is a schematic diagram of an exemplary control unit.
Figure 3A:
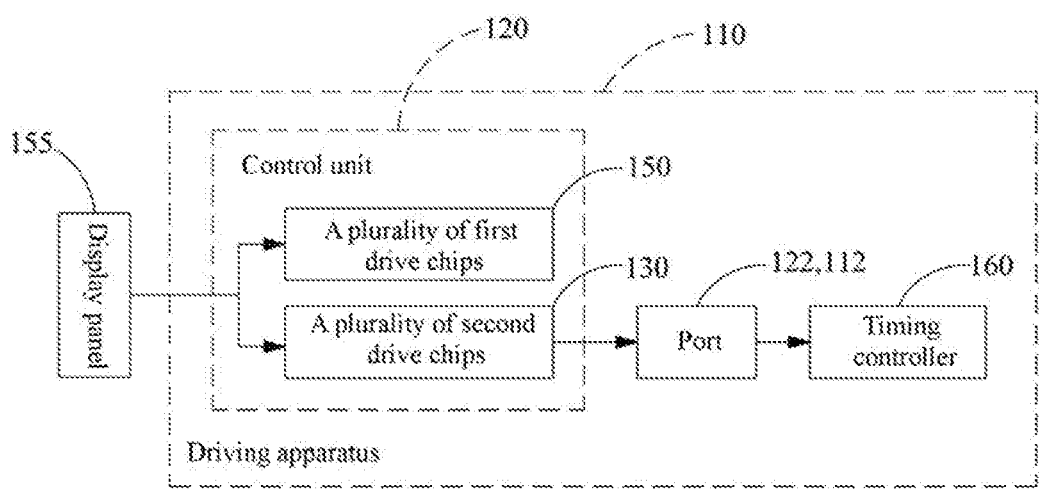
FIG. 3a is a module diagram of a display panel driving apparatus according to an embodiment of this application.

FIG. 2a is a schematic diagram of an exemplary driving apparatus. FIG. 2b is a schematic diagram of an exemplary control unit. FIG. 3a is a module diagram of a display panel driving apparatus according to an embodiment of this application. Referring to FIG. 2a, FIG. 2b, and FIG. 3a, in an embodiment of this application, a display panel driving apparatus 110 includes: a control unit 120, where the control unit 120 includes a plurality of first drive chips 150, electrically connected to a display panel 155, and a plurality of second drive chips 130, electrically connected to the display panel 155, where each of the second drive chip 130 is connected to a port 112 or a port 122; and a TCON 160, separately electrically connected to the second drive chips 130 and the first drive chips 150 and configured to drive and transmit information transmitted by the second drive chips 130. The control unit 120 is of a symmetric design.

Figure 3B:
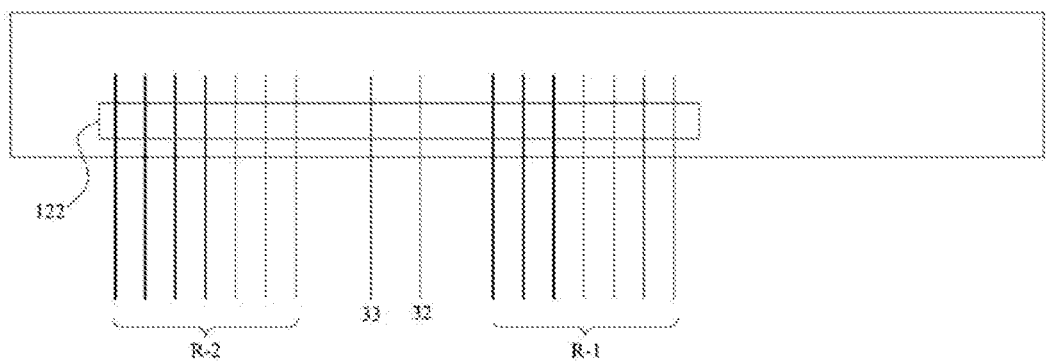
FIG. 3b is a schematic diagram of port connecting lines on a control unit according to an embodiment of this application.
Figure 4:
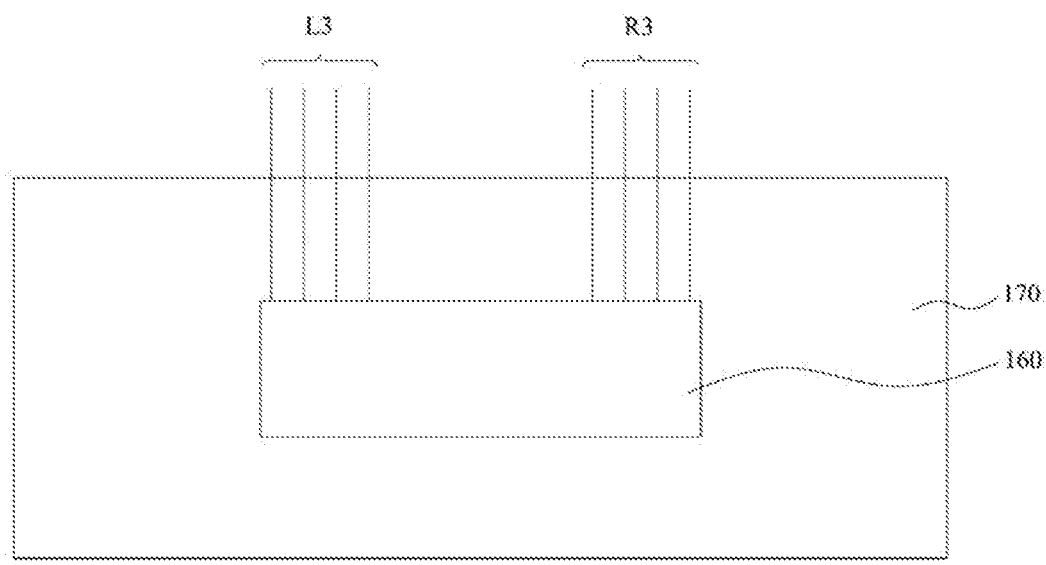
FIG. 4 is a schematic diagram of a TCON according to an embodiment of this application.

FIG. 3b is a schematic diagram of port connecting lines on a control unit according to an embodiment of this application. FIG. 4 is a schematic diagram of a TCON according to an embodiment of this application. Referring to FIG. 2a, FIG. 2b, FIG. 3a, FIG. 3b, and FIG. 4, in an embodiment of this application, a display panel driving apparatus 110 includes: a control unit 120, where the control unit 120 includes: a plurality of first drive chips 150, electrically connected to a display panel 155, and a plurality of second drive chips 130, electrically connected to the display panel 155, where each of the second drive chip 130 is connected to a port 122; a TCON 160, including a plurality of data output interfaces and a plurality of timing output interfaces, where the TCON 160 is separately electrically connected to the first drive chips 150 and the second drive chips 130 and is configured to drive and transmit information transmitted by the second drive chips 130; and a circuit board 170, including a plurality of data input interfaces and a plurality of timing input interfaces, where the plurality of data input interfaces and the plurality of timing input interfaces are electrically coupled to a source drive circuit. The quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces.

In an embodiment, the port 122 has a plurality of groups of information signals R1 and R2 and at least one pair of frequency signals.

In an embodiment, the port 122 is configured to electrically couple to the TCON 160.

In an embodiment, the port 122 further includes a plurality of adjacent circuit lines 32 and 33 capable of transmitting a data transmission triggering signal and at least one circuit line 31 capable of transmitting a gate dual-mode control signal.

In an embodiment, the port 122 is a micro low-voltage differential signal.

In an embodiment, the circuit line 31 transmitting a gate dual-mode control signal is of a high voltage after transmitting a data pair and being short-circuited.

In an embodiment, the quantity of the plurality of data input interfaces is n times the quantity of the plurality of data output interfaces, and each data output interface is electrically coupled to n data input interfaces, where n is a positive integer.

In an embodiment, the quantity of the plurality of data output interfaces is m, and a $j^{th}$ data input interface is connected to an $i^{th}$ data output interface, where i is a remainder of diving j by m, and i, j, and m are positive integers.

In an embodiment, the source drive circuit includes a plurality of groups of source chip-on-films, and a data transmission triggering line is configured for each group; the data transmission triggering lines are electrically coupled to each other.

In an embodiment, the data transmission triggering lines 32 and 33 are electrically coupled to the TCON 160; the TCON 160 controls connection and disconnection between the data transmission triggering lines 32 and 33.

In an embodiment, the TCON 160 includes a mode signal interface, and is electrically coupled to a gate drive circuit by using a line of the circuit board 170. The TCON 160 outputs a mode signal by using the mode signal interface, so that the gate drive circuit is switched between a single-line scanning mode and a multi-line scanning mode.

In an embodiment, the multi-line scanning mode is a dual-line scanning mode or a three-line scanning mode. The TCON 160 is of a full high definition (FHD) specification. The circuit board 170 is connected to a display substrate 155, and the display substrate 155 is of a UD specification. The gate drive circuit runs in the multi-line scanning mode.

In an embodiment, the display panel driving apparatus 110 may be adaptive to TCONs of different specifications or display panels of different resolutions. For example, a high definition (HD) TCON drives an UD display panel. Alternatively, an HD TCON drives an FHD display panel.

Referring to FIG. 2a, FIG. 2b, FIG. 3a, FIG. 3b, and FIG. 4, in an embodiment of this application, a display panel driving apparatus 110 includes: a control unit 120, where the control unit 120 includes: a plurality of first drive chips 150, electrically connected to a display panel 155, and a plurality of second drive chips 130, electrically connected to the display panel 155, where each of the second drive chip 130 is connected to a port 112; a TCON 160, including a plurality of data output interfaces and a plurality of timing output interfaces, where the TCON 160 is separately electrically connected to the first drive chips 150 and the second drive chips 130 and is configured to drive and transmit information transmitted by the second drive chips 130; and a circuit board 170, including a plurality of data input interfaces and a plurality of timing input interfaces, where the plurality of data input interfaces and the plurality of timing input interfaces are electrically coupled to a source drive circuit. The quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces.

In an embodiment, the port 112 has a plurality of groups of information signals (not shown) and at least one pair of frequency signals (not shown).

In an embodiment, the port 112 is configured to electrically couple to the TCON 160.

In an embodiment, the port 112 further includes a plurality of adjacent circuit lines (not shown) capable of transmitting a data transmission triggering signal and at least one circuit line (not shown) capable of transmitting a gate dual-mode control signal.

In an embodiment, the port 112 is a micro low-voltage differential signal.

In an embodiment, the circuit line transmitting a gate dual-mode control signal is of a high voltage after transmitting a data pair and being short-circuited.

In an embodiment, the quantity of the plurality of data input interfaces is n times the quantity of the plurality of data output interfaces, and each data output interface is electrically coupled to n data input interfaces, where n is a positive integer.

In an embodiment, the quantity of the plurality of data output interfaces is m, and a $j^{th}$ data input interface is connected to an $i^{th}$ data output interface, where i is a remainder of diving j by m, and i, j, and m are positive integers.

In an embodiment, the source drive circuit includes a plurality of groups of source chip-on-films, and a data transmission triggering line is configured for each group; the data transmission triggering lines are electrically coupled to each other.

In an embodiment, the data transmission triggering lines are electrically coupled to the TCON 160; the TCON 160 controls connection and disconnection between the data transmission triggering lines.

In an embodiment, the TCON 160 includes a mode signal interface, and is electrically coupled to a gate drive circuit by using a line of the circuit board 170. The TCON 160 outputs a mode signal by using the mode signal interface, so that the gate drive circuit is switched between a single-line scanning mode and a multi-line scanning mode.

In an embodiment, the multi-line scanning mode is a dual-line scanning mode or a three-line scanning mode. The TCON 160 is of an FHD specification. The circuit board 170 is connected to a display substrate 155, and the display substrate 155 is of a UD specification. The gate drive circuit runs in the multi-line scanning mode.

In an embodiment, the display panel driving apparatus 110 may be adaptive to TCONs of different specifications or display panels of different resolutions. For example, an HD TCON drives an UD display panel. Alternatively, an HD TCON drives an FHD display panel. The display panel may be, for example, an LCD display panel, an OLED display panel, a QLED display panel, a curved-surface display panel, or another display panel.

Referring to FIG. 2a, FIG. 2b, FIG. 3b, and FIG. 4, in an embodiment, output data of the TCON 160 is a dual-side multi-pair output signal divided on left and right sides (using the right side as an example). R3 outputted by the TCON 160 is correspondingly short-circuited to original R1 and R2 on the port 122 of the control unit 120.

Referring to FIG. 2a, FIG. 2b, FIG. 3a, FIG. 3b, and FIG. 4, in an embodiment of this application, a display panel driving apparatus 110 includes: a control unit 120, where the control unit 120 includes: a plurality of first drive chips 150, electrically connected to a display panel 155, and a plurality of second drive chips 130, electrically connected to the display panel 155, where each of the second drive chip 130 is connected to a port 112 or a port 122; a TCON 160, including a plurality of data output interfaces and a plurality of timing output interfaces, where the TCON 160 is separately electrically connected to the first drive chips 150 and the second drive chips 130 and is configured to drive and transmit information transmitted by the second drive chips 130; and a circuit board 170, including a plurality of data input interfaces and a plurality of timing input interfaces, where the plurality of data input interfaces and the plurality of timing input interfaces are electrically coupled to a source drive circuit. The quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces. The quantity of the plurality of data input interfaces is n times the quantity of the plurality of data output interfaces, and each data output interface is electrically coupled to n data input interfaces, where n is a positive integer. The quantity of the plurality of data output interfaces is m, and a $j^{th}$ data input interface is connected to an $i^{th}$ data output interface, where i is a remainder of diving j by m, and i, j, and m are positive integers. The source drive circuit includes a plurality of groups of source chip-on-films, and a data transmission triggering line is configured for each group. The data transmission triggering lines are electrically coupled to each other; the data transmission triggering lines are electrically coupled to the TCON 160. The TCON 160 controls connection and disconnection between the data transmission triggering lines. The TCON 160 includes a mode signal interface, and is electrically coupled to a gate drive circuit by using a line of the circuit board 170, and the TCON 160 outputs a mode signal by using the mode signal interface, so that the gate drive circuit is switched between a single-line scanning mode and a multi-line scanning mode. The multi-line scanning mode is a dual-line scanning mode or a three-line scanning mode. The circuit board 170 is connected to a display substrate 155; the gate drive circuit runs in the multi-line scanning mode. The plurality of second drive chips 130 is of a symmetric design.

Referring to FIG. 2a, FIG. 2b, FIG. 3a, FIG. 3b, and FIG. 4, in an embodiment of this application, a driving method of a display panel driving apparatus 110 includes: arranging a plurality of second drive chips 131 to 136 by using a control unit 120, where the second drive chips 131 to 136 are connected to a port 122; arranging a plurality of circuit lines by using a TCON 160, where the TCON 160 is configured to drive and transmit information needed by the second drive chips 131 to 136; and separately connecting the second drive chips 131 to 136 to the TCON 160 by using the port 122.

In an embodiment, in the driving method of a display panel driving apparatus, the step of separately connecting the second drive chips 131 to 136 to the TCON 160 by using the port 122 includes: interconnecting, by using the port 122, one group of a plurality of circuit lines R3 on the right of the TCON 160 and at least one frequency signal line to the second drive chips 131 to 136 to provide the transmitted information, to perform information matching, so as to implement an information replication function.

In an embodiment, in the driving method of a display panel driving apparatus, the port 122 has a plurality of groups of information signals R1 and R2 and at least one pair of frequency signals.

In an embodiment, in the driving method of a display panel driving apparatus, the port 122 is configured to electrically couple to the TCON 160.

In an embodiment, in the driving method of a display panel driving apparatus, the port 122 further includes a plurality of adjacent circuit lines 32 and 33 capable of transmitting a data transmission triggering signal and at least one circuit line 31 capable of transmitting a gate dual-mode control signal.

Referring to FIG. 2a, FIG. 2b, FIG. 3a, FIG. 3b, and FIG. 4, in an embodiment of this application, a driving method of a display panel driving apparatus includes: arranging a plurality of second drive chips 131 to 136 by using a control unit 120, where the second drive chips 131 to 136 are connected to a port 112; arranging a plurality of circuit lines by using a TCON 160, where the TCON 160 is configured to drive and transmit information needed by the second drive chips 131 to 136; and separately connecting the second drive chips 131 to 136 to the TCON 160 by using the port 112.

In an embodiment, in the driving method of a display panel driving apparatus, the step of separately connecting the second drive chips 130 to the TCON 160 by using the port 112 includes: interconnecting, by using the port 112, one group of a plurality of circuit lines L3 on the left of the TCON 160 and at least one frequency signal line to the second drive chips 130 to provide the transmitted information, to perform information matching, so as to implement an information replication function.

In an embodiment, in the driving method of a display panel driving apparatus, the port 112 has a plurality of groups of information signals (not shown) and at least one pair of frequency signals (not shown).

In an embodiment, in the driving method of a display panel driving apparatus, the port 112 is configured to electrically couple to the TCON 160.

In an embodiment, in the driving method of a display panel driving apparatus, the port 112 further includes a plurality of adjacent circuit lines (not shown) capable of transmitting a data transmission triggering signal and at least one circuit line (not shown) capable of transmitting a gate dual-mode control signal.

Figure 5:
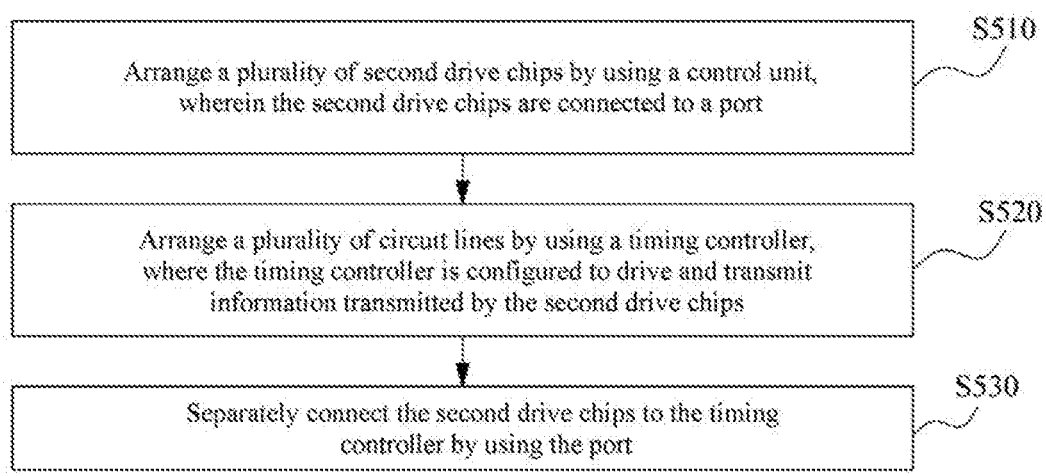
FIG. 5 is a flowchart of a driving method of a display panel driving apparatus according to an embodiment of this application.

FIG. 5 is a flowchart of a driving method of a display panel driving apparatus according to an embodiment of this application. Referring to FIG. 5, in procedure 5510, a plurality of second drive chips is arranged by using a control unit. The second drive chips are connected to a port.

Referring to FIG. 5, in procedure 5520, a plurality of circuit lines is arranged by using a TCON. The TCON is configured to drive and transmit information transmitted by the second drive chips.

Referring to FIG. 5, in procedure 5530, the second drive chips are separately connected to the TCON by using the port.

Referring to FIG. 2a, FIG. 2b, FIG. 3a, FIG. 3b, and FIG. 4, in an embodiment of this application, a driving method includes: arranging a control unit 120 by using a display panel driving apparatus 110; arranging a plurality of second drive chips 130 by using the control unit 120, where the second drive chips 130 are connected to a port 112 or a port 122; arranging a plurality of circuit lines by using a TCON 160, where the TCON 160 is configured to drive and transmit information transmitted by the second drive chips 130; and separately connecting the second drive chips 130 to the TCON 160 by using the port 112 or the port 122.

Figure 6A:
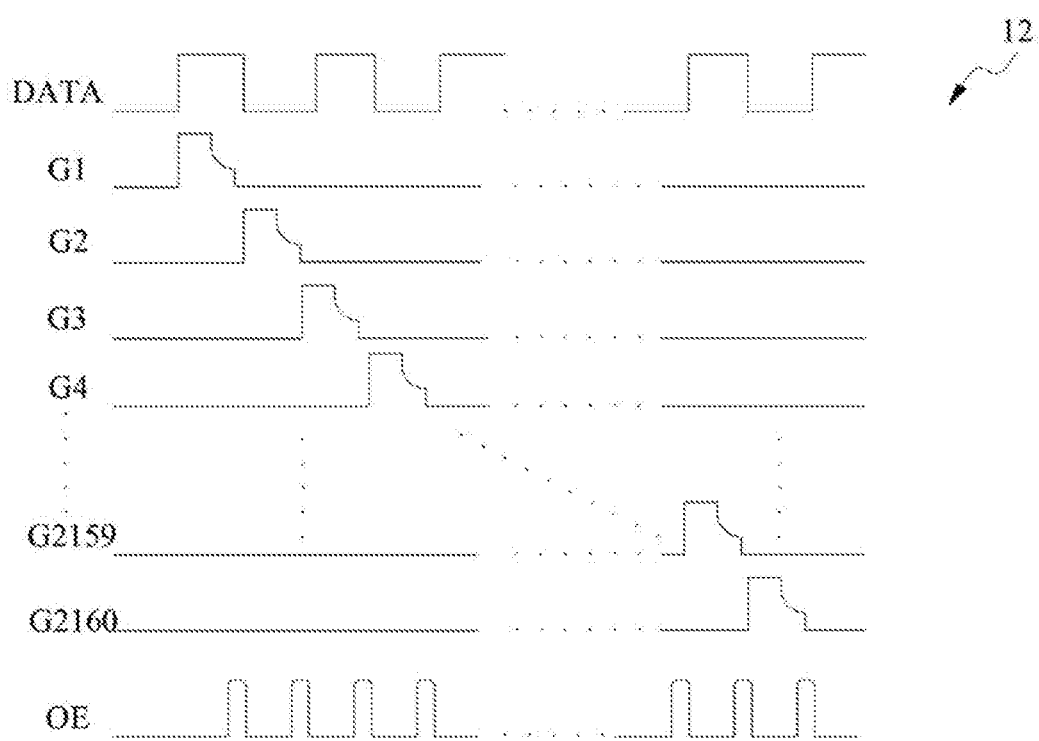
FIG. 6a is a schematic diagram of an exemplary waveform of a first drive chip.
Figure 6B:
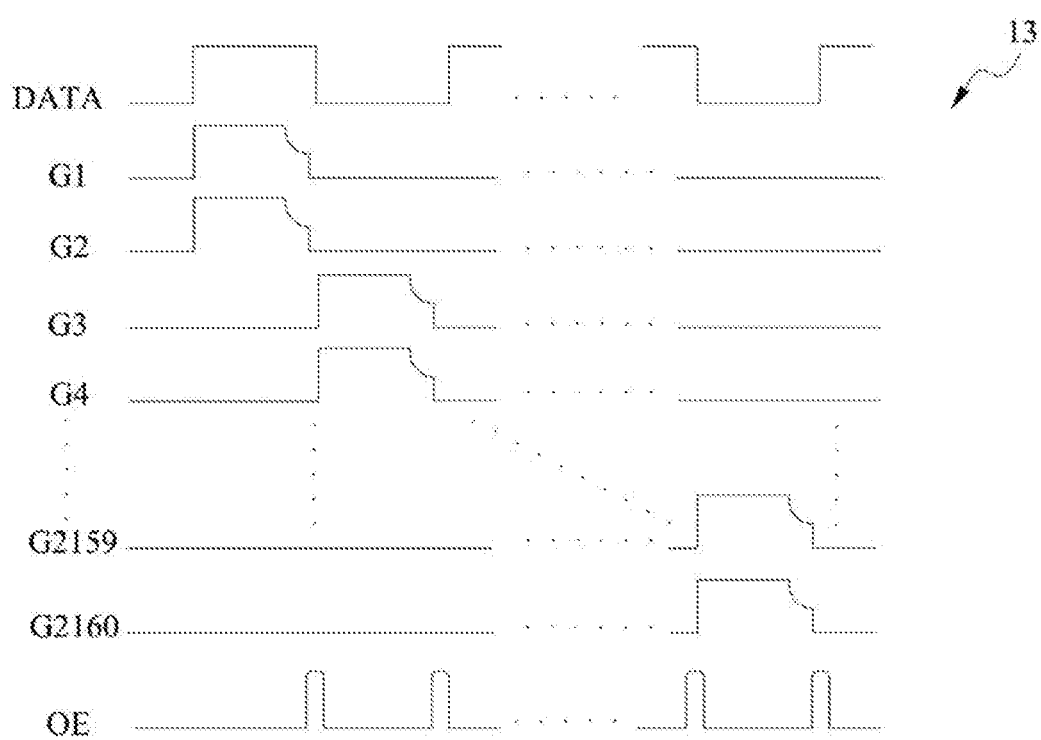
FIG. 6b is a schematic diagram of a waveform of a first drive chip according to an embodiment of this application.

FIG. 6a is a schematic diagram of an exemplary waveform of a first drive chip. FIG. 6b is a schematic diagram of a waveform of a first drive chip according to an embodiment of this application. Referring to FIG. 6a and FIG. 6b, a waveform of a first drive chip is switched from a normal mode 12 to a dual mode 13 needing to be enabled, that is, two rows of functions are enabled at the same time. As shown in FIG. 6b, when the functions are enabled, gates G1 to G2160 generate gate signals from a row-by-row manner to an in-pair manner.

By means of this application, the costs of design of a drive circuit can be reduced; in addition, an existing drive chip does not need to be changed, and the costs of an integrated system single chip on a client are greatly reduced.

The wordings such as "in some embodiments" and "in various embodiments" are repeatedly used. The wordings usually refer to different embodiments, but they may also refer to a same embodiment. The words, such as "comprise", "have", and "include", are synonyms, unless other meanings are indicated in the context thereof.

The foregoing descriptions are merely embodiments of this application, and are not intended to limit this application in any form. Although this application has been disclosed above through the specific embodiments, the embodiments are not intended to limit this application. Any person skilled in the art can make some variations or modifications, namely, equivalent changes, according to the foregoing disclosed technical content to obtain equivalent embodiments without departing from the scope of the technical solutions of this application. Any simple amendment, equivalent change, or modification made to the foregoing embodiments according to the technical essence of this application without departing from the content of the technical solutions of this application shall fall within the scope of the technical solutions of this application.

What is claimed is:

1. A display panel driving apparatus, comprising:
    a control unit, comprising:
        a plurality of first drive chips, electrically connected to a display panel; and
        a plurality of second drive chips, electrically connected to the display panel, wherein each of the second drive chip is connected to a port;
    a timing controller, comprising a plurality of data output interfaces and a plurality of timing output interfaces, wherein the timing controller is separately electrically connected to the first drive chips and the second drive chips and is configured to drive and transmit information transmitted by the second drive chips; and
    a circuit board, comprising a plurality of data input interfaces and a plurality of timing input interfaces, wherein the timing controller is located on the circuit board, and the plurality of data input interfaces and the plurality of timing input interfaces are electrically coupled to a source drive circuit, wherein
    the quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces;
    the quantity of the plurality of data input interfaces is n times the quantity of the plurality of data output interfaces, and each data output interface is electrically coupled to n data input interfaces, wherein n is a positive integer;
    the timing controller comprises a mode signal interface;
    the timing controller is electrically coupled to a gate drive circuit by using a line of the circuit board, and the timing controller outputs a mode signal by using the mode signal interface, so that the gate drive circuit is switched between a single-line scanning mode and a multi-line scanning mode; and
    the multi-line scanning mode is a dual-line scanning mode or a three-line scanning mode.

2. The display panel driving apparatus according to claim 1, wherein the quantity of the plurality of data output interfaces is m, and a $j^{th}$ data input interface is connected to an $i^{th}$ data output interface.

3. The display panel driving apparatus according to claim 2, wherein i is a remainder of diving j by m, and i, j, and m are positive integers.

4. The display panel driving apparatus according to claim 1, wherein the source drive circuit comprises a plurality of groups of source chip-on-films, and a data transmission triggering line is configured for each group.

5. The display panel driving apparatus according to claim 4, wherein the data transmission triggering lines are electrically coupled to each other.

6. The display panel driving apparatus according to claim 4, wherein the data transmission triggering lines are electrically coupled to the timing controller.

7. The display panel driving apparatus according to claim 4, wherein the timing controller controls connection and disconnection between the data transmission triggering lines.

8. The display panel driving apparatus according to claim 1, wherein the quantity of the plurality of data output interfaces is m, and a $j^{th}$ data input interface is connected to an $i^{th}$ data output interface.

9. The display panel driving apparatus according to claim 1, wherein the gate drive circuit runs in the multi-line scanning mode.

10. The display panel driving apparatus according to claim 1, wherein the port is configured to electrically couple to the timing controller.

11. The display panel driving apparatus according to claim 1, wherein the port has a plurality of groups of information signals and at least one pair of frequency signals.

12. The display panel driving apparatus according to claim 1, wherein the port comprises a plurality of adjacent circuit lines being capable of transmitting a data transmission triggering signal and at least one circuit line being capable of transmitting a gate dual-mode control signal.

13. A driving method of a display panel driving apparatus, comprising:
arranging a plurality of second drive chips by using a control unit, wherein the second drive chips are connected to a port;
arranging a plurality of circuit lines by using a timing controller, wherein the timing controller is configured to drive and transmit information transmitted by the second drive chips;
separately connecting the second drive chips to the timing controller by using the port; and
providing a circuit board, comprising a plurality of data input interfaces and a plurality of timing input interfaces, wherein the timing controller is located on the circuit board, and the plurality of data input interfaces and the plurality of timing input interfaces are electrically coupled to a source drive circuit, wherein:
the timing controller comprises a plurality of data output interfaces and a plurality of timing output interfaces;
the quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces;
the quantity of the plurality of data input interfaces is n times the quantity of the plurality of data output interfaces, and each data output interface is electrically coupled to n data input interfaces, wherein n is a positive integer;
the timing controller comprises a mode signal interface;
the timing controller is electrically coupled to a gate drive circuit by using a line of the circuit board, and the timing controller outputs a mode signal by using the mode signal interface, so that the gate drive circuit is switched between a single-line scanning mode and a multi-line scanning mode; and
the multi-line scanning mode is a dual-line scanning mode or a three-line scanning mode.

14. The driving method of a display panel driving apparatus according to claim 13, wherein the step of separately connecting the second drive chips to the timing controller by using the port comprises:
interconnecting, by the timing controller by using the port, one group of a plurality of circuit lines on each of left and right sides of the timing controller and at least one frequency signal line to the second drive chips to provide the transmitted information, to perform information matching, so as to implement an information replication function.

15. A display panel driving apparatus, comprising:
a control unit, comprising:
a plurality of first drive chips, electrically connected to a display panel; and
a plurality of second drive chips, electrically connected to the display panel, wherein each of the second drive chip is connected to a port;
a timing controller, comprising a plurality of data output interfaces and a plurality of timing output interfaces, wherein the timing controller is separately electrically connected to the first drive chips and the second drive chips and is configured to drive and transmit information transmitted by the second drive chips; and
a circuit board, comprising a plurality of data input interfaces and a plurality of timing input interfaces, wherein the timing controller is located on the circuit board, and the plurality of data input interfaces and the plurality of timing input interfaces are electrically coupled to a source drive circuit, wherein
the quantity of the plurality of data input interfaces is greater than the quantity of the plurality of data output interfaces, each data output interface is electrically coupled to one or more of the data input interfaces, and the plurality of timing input interfaces is electrically coupled to the timing output interfaces;
the quantity of the plurality of data input interfaces is n times the quantity of the plurality of data output interfaces, and each data output interface is electrically coupled to n data input interfaces, wherein n is a positive integer; the quantity of the plurality of data output interfaces is m, and a $j^{th}$ data input interface is connected to an $i^{th}$ data output interface, wherein i is a remainder of diving j by m, and i, j, and m are positive integers;
the source drive circuit comprises a plurality of groups of source chip-on-films, and a data transmission triggering line is configured for each group; the data transmission triggering lines are electrically coupled to each other;
the data transmission triggering lines are electrically coupled to the timing controller; the timing controller controls connection and disconnection between the data transmission triggering line;
the timing controller comprises a mode signal interface;
the timing controller is electrically coupled to a gate drive circuit by using a line of the circuit board, and the timing controller outputs a mode signal by using the mode signal interface, so that the gate drive circuit is switched between a single-line scanning mode and a multi-line scanning mode; and
the multi-line scanning mode is a dual-line scanning mode or a three-line scanning mode.

* * * * *